Sept. 1, 1931. A. N. THOMAS 1,821,247
ADJUSTABLE SEAT
Filed Oct. 26, 1929
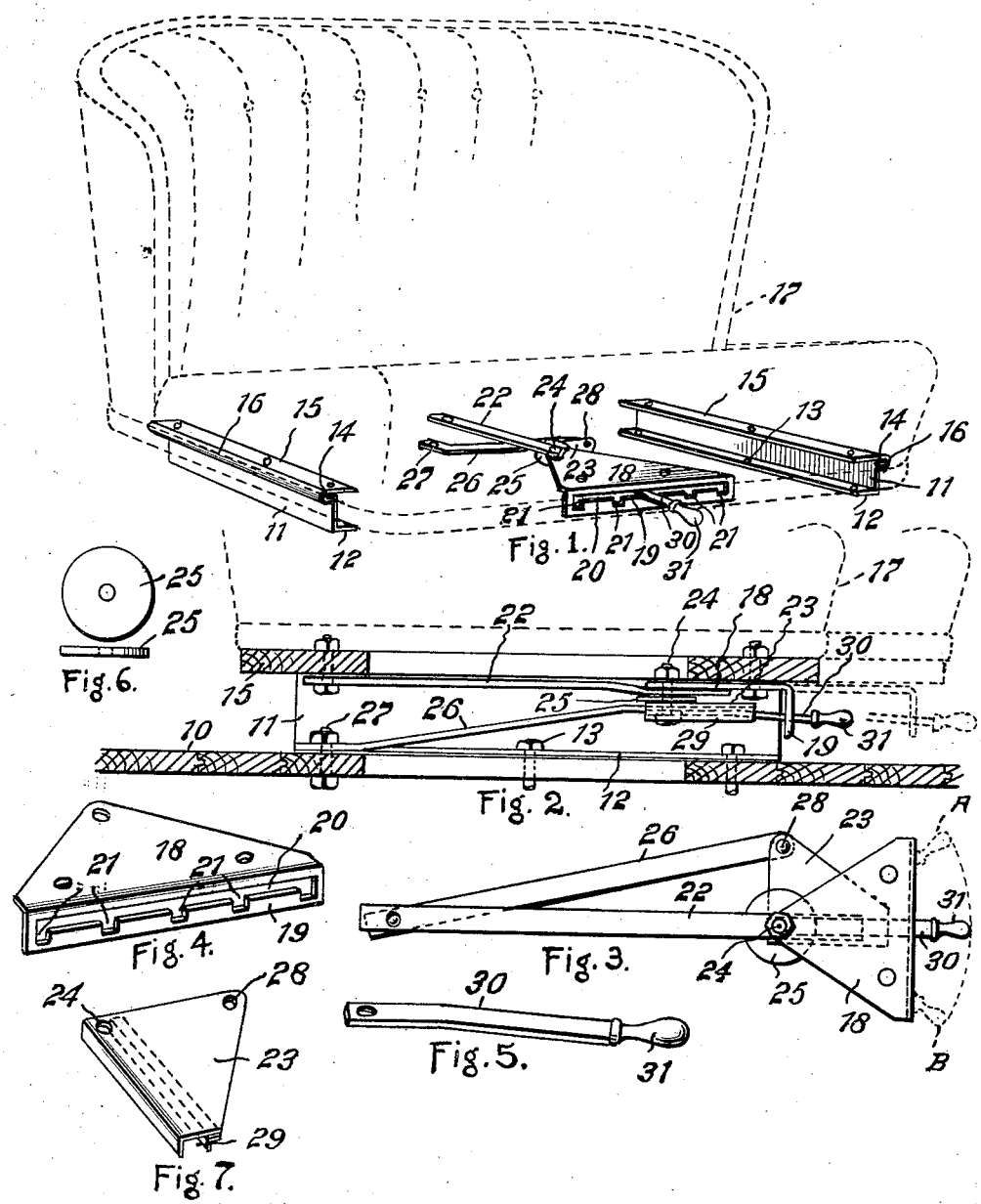
A. N. Thomas.
INVENTOR.
BY Harry Freese
ATTORNEY Patented Sept. 1, 1931

1,821,247

UNITED STATES PATENT OFFICE

ARVINE N. THOMAS, OF CANTON, OHIO

ADJUSTABLE SEAT

Application filed October 26, 1929. Serial No. 402,634.

The invention relates to seats for use in automobiles and the like, and particularly to a seat adapted to be adjusted in a horizontal plane.

The object of the improvement is to provide a seat of this character, including a lower frame adapted to be fixed to the floor of the vehicle, and an upper frame slidable thereon and provided with means for moving the same forwardly or rearwardly upon the fixed frame and holding it in adjusted position thereon.

An embodiment of the invention is illustrated in the accompanying drawings, in which—

Figure 1 is a perspective view of the improved seat, parts being broken away and parts shown in broken lines for the purpose of illustration;

Fig. 2, an enlarged transverse sectional view through the seat, showing the adjusting means;

Fig. 3, a plan view of the adjusting means;

Fig. 4, a perspective view of the rack bracket for holding the adjusting lever in position;

Fig. 5, a perspective view of the adjusting lever;

Fig. 6, a plan view and an edge elevation of the washer surrounding the pivot for the adjusting lever; and Fig. 7, a detail perspective view of the segment which carries the adjusting lever.

Similar numerals refer to similar parts throughout the several figures of the drawings.

The floor of an automobile or the like is indicated generally at 10, and the lower or fixed frame 11 is provided with the inturned flange 12, adapted to be secured to the floor as by bolts, screws, or the like, shown at 13.

The fixed frame 11 is provided at its upper edges with the outturned flanges 14 and the movable frame 15 is provided with the channel 16 slidably mounted upon said flanges, whereby the movable frame may be moved forwardly and rearwardly upon the fixed frame.

An upholstered seat of any usual and well known construction, indicated in broken lines at 17, is fixedly mounted upon the movable frame, and adapted to be adjusted laterally therewith.

Means for adjusting the movable frame, and holding it in adjusted position, includes a rack bracket 18 fixed upon the forward edge of the movable frame, and having the depending flange 19 at its forward edge in which is provided the horizontal slot 20 having the spaced depending notches 21 therein. A bar 22 may lead from the rear end of the bracket 18 to the rear portion of the movable frame.

The segment 23 is pivoted as at 24 beneath the bar 22, a wearing washer 25 being interposed between the bar 22 and the segment.

A link 26 is pivoted at its rear end, as at 27, to the fixed frame or floor of the car, the forward end being pivoted as at 28 to the segment 23.

It will be noted, particularly as shown in Fig. 7, that the segment 23 has at one side a depending channel 29, within which is received the spring lever 30, the forward end of which is extended through the slot 20 in the depending flange 19 of the bracket, and adapted to contact with any of the notches 21 therein, a handle 31 being preferably provided at the extremity of said lever for operating the same.

From the above, it will be obvious that by raising the spring lever 30 out of the particular notch 21 in which it may be engaged, and swinging it to the right, through the slot 20, the movable frame and seat carried thereby, will be slidably moved forwardly, while by throwing the lever in the opposite direction, the seat will be moved rearwardly.

As shown in Fig. 3, in broken lines, the lever may be moved to the position shown at A to move the seat to the forward limit of its movement and to the position shown at B to move it to the rearmost position.

I claim:

1. An adjustable seat including a fixed frame, a horizontally movable frame mounted thereon, a seat carried by said movable frame, a segment pivoted upon the movable frame, a link pivoted at one end to the segment and at its other end to the fixed frame, a channel formed upon the segment, and a lever located in said channel for moving the segment upon its pivot to horizontally move the movable frame.

2. An adjustable seat including a fixed frame, a horizontally movable frame mounted thereon, a seat carried by said movable frame, a segment pivoted upon the movable frame, a link pivoted at one end to the segment and at its other end to the fixed frame, a channel formed upon the segment, a lever located in said channel for moving the segment upon its pivot to horizontally move the movable frame, and means for normally holding the lever against movement.

3. An adjustable seat including a fixed frame, a horizontally movable frame mounted thereon, a seat carried by said movable frame, a segment pivoted upon the movable frame, a link pivoted at one end to the segment and at its other end to the fixed frame, a channel formed upon the segment, a lever located in said channel for moving the segment upon its pivot to horizontally move the movable frame, and a notched bracket for normally holding the lever against movement.

In testimony that I claim the above, I have hereunto subscribed my name.

ARVINE N. THOMAS.